United States Patent
Alim

Patent Number: 5,203,915
Date of Patent: Apr. 20, 1993

[54] PASSIVATING COATING FOR METAL OXIDE VARISTORS

[75] Inventor: Mohammed A. Alim, Medina, Ohio

[73] Assignee: Hubbell Incorporated, Orange, Conn.

[21] Appl. No.: 855,678

[22] Filed: Mar. 23, 1992

Related U.S. Application Data

[63] Continuation-in-part of Ser. No. 704,216, May 22, 1991, abandoned.

[51] Int. Cl.⁵ .................. C04B 14/10; C04B 12/02
[52] U.S. Cl. .......................... 106/286.2; 106/691; 501/97; 501/105; 501/130; 501/131
[58] Field of Search ............... 106/691, 286.2; 501/97, 501/105, 130, 136

[56] References Cited

U.S. PATENT DOCUMENTS

3,128,194  4/1964  Christie, Jr. .................. 501/130
4,046,847  9/1977  Kresge ........................ 264/61

OTHER PUBLICATIONS

*Ceramic Industry*, "Material's Handbook", vol. 132, No. 1, Solon, Ohio, pp. 21, 73, Jan. 1973.

*Primary Examiner*—David Brunsman
*Attorney, Agent, or Firm*—Jerry M. Presson; Robert H. Berdo

[57] ABSTRACT

It is disclosed that the properties of a ceramic mullite-kaolinite based passivating coating composition applied as a collar to metal oxide varistor valve block cylindrical surfaces are improved by including in the coating composition from 0.03 to 15% by weight of the coating composition one or more of the following additive compounds: $TiO_2$; $Y_2O_3$; $ZrO_2$; $ZnO$; Boroflux ($2ZnO \cdot 3B_2O_3 \cdot 7H_2O$; or $3ZnO \cdot 2B_2O_3 \cdot 5H_2(O)$); or $Si_3N_4$. The coating composition comprises by dry weight a mixture of 55–85% mullite and 15–45% kaolinite, one or a mixture of the above additive compounds, and sufficient water to form a sprayable slurry. The inclusion of the additive compound results in enhanced contact adhesion between the collar and the metal oxide varistor peripheral surface.

9 Claims, 1 Drawing Sheet

PASSIVATING COATING FOR METAL OXIDE VARISTORS

CROSS-REFERENCE TO RELATED APPLICATION

This is a continuation-in-part of Ser. No. 07/704,216, filed May 22, 1991 now abandoned.

BACKGROUND OF THE INVENTION

This invention relates to an improvement in a passivating coating or collar applied to metal oxide varistors (MOVs) which are primarily zinc oxide and which are useful in a valve block of a surge arrester.

Surge arresters are used to protect electrical equipment against insulation damage resulting from voltage surges which exceed the normal operating voltage of the equipment. Typically, an arrester includes a valve section and a gap section in series inside a cylindrical insulating housing. The valve section is made up of one or more metal oxide, primarily zinc oxide, varistor disks stacked face-to-face. Each of the disks of the arrester is generally provided with a passivating coating material about the periphery, or collar, to improve its stability via preventing flashover, surface conduction, corona effect, tracking, etc. under high electrical surges (e.g., switching transients, lightning, etc.) and temporary over-voltages. The passivating material is generally a ceramic material coated on the peripheral surface of the disk to provide a ceramic collar material. The ceramic based collar material must provide:

1. isolation of the MOV surfaces from the immediate environment and prevention of gas or particle diffusion;
2. high mechanical strength and/or elastic properties;
3. higher resistivity than the MOV valve block at maximum continuous operating voltage;
4. similar dielectric constant to that of zinc oxide (i.e., $\neq 8.5$ for MOV at extremely high electrical stress in the upturn region of the current voltage characteristic);
5. identical thermal properties with zinc oxide (i.e., thermal/heat conductivity, thermal expansion, heat diffusivity, specific heat, etc.); and
6. compact adhesion and nearly no variation in the physical gap between the collar and the MOV surfaces at any stress level.

U.S. Pat. No. 4,046,847 discloses the production of metal oxide varistors which may be incorporated into an over-voltage surge arrester either alone or as one of a number of arrester valve disks. A ceramic slurry may be coated on the peripheral surface of the disk prior to one of the reheating cycles used during the sintering process so that it will set in the course of reheating to form a flashover preventive collar. This patent discloses that a suitable slurry for this purpose is a water-based one containing a dry weight ingredient unit of filler-clay mix, of which 80% is mullite and 20% is Florida kaolin. The filler-clay mix is combined with 10% dry weight of an inorganic binder consisting of equal weights of monoaluminum phosphate and concentrated phosphoric acid. The combination is slurried with about 60% dry weight of water as a vehicle. The slurry is applied by spraying the disk to a thickness of about ¼ millimeter. The slurry will cure or set to form a ceramic collar at anywhere above 250° C., depending upon the time at that temperature. The disclosure of this patent is incorporated herein by reference.

U.S. Pat. No. 3,959,543, the disclosure of which is incorporated herein by reference, discloses a sintered zinc oxide, non-linear resistance surge arrester disk provided with a glass anti-flashover collar having a relatively low fusing temperature and a relatively low coefficient of thermal expansion. The glass comprises the following constituents in proportion to one another by weight: about 44.5% lead oxide; about 24.5% zinc oxide; about 20.5% boric oxide; about 4.5% silicon oxide; and about 6.0% cupric oxide. In making the disk, the zinc oxide composition in powdered form is pressed into a disk shape with a diameter of about 3.4 inches and a thickness of somewhat over 1 inch to form a blank. This blank is then sintered by firing in air at a temperature of about 1200° C. for about five hours. Thereafter, it is cooled at about 100° C. per hour, and a slurry of finely divided glass particles, having the composition as described above and mixed with ball clay to hold the glass in suspension, is applied to the outside surface of the perimeter of the disk. The disk with the applied slurry is then fired again in air at a temperature of between 640° C. and 650° C. for about 30 minutes to cause the glass particles in the slurry to fuse to one another and to the disk to form a collar.

SUMMARY OF THE INVENTION

It has now been discovered that the properties of a ceramic mullite-kaolinite based passivating coating composition applied as a collar to metal oxide varistor valve block cylindrical surfaces are improved by including in the coating composition from 0.03 to 15% by weight of the coating composition one of the following additive compounds $TiO_2$; $Y_2O_3$; $ZrO_2$; $ZnO$; Boroflux ($2ZnO \cdot 3B_2O_3 \cdot 7H_2O$ or $3ZnO \cdot 2B_2O_3 \cdot 5H_2O$); or $Si_3N_4$. Obviously, the amount of additive in the composition is in addition to the amount of that compound that may be inherently present in the kaolinite as an impurity. The coating composition comprises by dry weight a mixture of 55–85% mullite $[3Al_2O_3 \cdot 2SiO_2]$ and 15–45% kaolinite $[Al_2Si_2O_5(OH)_4]$, one of the above additive compounds, and sufficient deionized water to form a sprayable slurry. The inclusion of the additive compound results in enhanced contact adhesion between the collar and the metal oxide varistor peripheral surface. The thus modified collar system exhibits a reduced physical interfacial gap with the metal oxide varistor surfaces and good resistance to thermal, electrical and mechanical shock. No degradation/deterioration or failure of this collar material is observed when the MOV valve block is subjected to an elevated temperature (120° C.) at an AC/DC bias, with 10% above the maximum continuous operating voltage for over 1,000 hours.

DETAILED DESCRIPTION OF THE INVENTION

Figure 1:
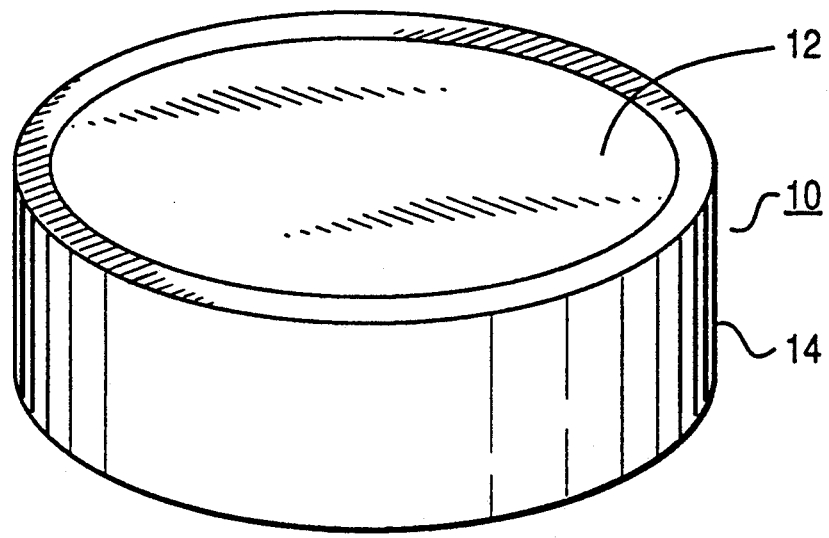
FIG. 1 is an elevational view of a metal oxide varistor having a collar provided in accordance with this invention.

A sintered metal oxide varistor disk 10 is shown in FIG. 1. The disk is of sintered zinc oxide containing, as impurities, minor amounts of other compounds as well known in the art such as shown in U.S. Pat. Nos. 3,959,543 and 4,046,847. The disk is provided with an electrode 12 on each face thereof, only one of which is shown in FIG. 1 About the outside perimeter of the disk is a ceramic anti-flash collar 14 which is provided as follows: the base collar composition is a mixture of mullite, kaolinite, monoaluminum phosphate [AlH$_6$(PO$_4$)$_3$], concentrated phosphoric acid [H$_3$(PO)$_4$)] and deionized water. The base composition comprises by dry weight 55-85% mullite and 15-45% kaolinite. This dry weight is combined with 5-6% inorganic binding constituents, e.g., 5-6% each of monoaluminum phosphate and phosphoric acid and diluted with 20-40% deionized water based upon the total weight of the coating composition before addition of the additive compounds. To compounds in an amount of from 0.03 to 15% by weight based upon the total weight of the coating composition: TiO$_2$; Y$_2$O$_3$; ZrO$_2$; ZnO; Boroflux (2ZnO·3B$_2$O$_3$·7H$_2$O; or 3ZnO·2B$_2$O$_3$·5H$_2$O); or Si$_3$N$_4$, preferably of a high degree of purity. When the additive is TiO$_2$, it is preferred that it be added in an amount of from 0.15 to 15% by weight based upon the total weight of the coating composition; and more preferably in an amount of from 0.20 to 15%. The composition is then thoroughly mixed by means of a high shear mixer. This composition mix when slurried is applied by spraying to the metal oxide varistor disk 10 to a thickness depending upon the diameter of the MOV valve block. Typically, this thickness varies between 0.3-1.3 millimeters. The essential spraying parameters of the resultant slurry are:

1. specific gravity in the range of 1.75-1.90;
2. pH in the range of 1.60-2.00;
3. non-newtonian fluid viscosity in the range of 3500-8000 cps; and
4. application temperature 18°-37° C. for air pressure in the range of 30-70 psi.

The slurry will cure or set to form a ceramic composite, generally above 100° C., depending upon time at that temperature. The composition described is curable in the temperature range 500°-700° C., depending on the time (1 to 3 hours) of annealing or post-heat treatment requirement of the sintered MOV block. In this temperature range, the composite ceramic forms enhanced contact adhesion with the MOV block surfaces. Also, time of annealing above three hours in this temperature range is not detrimental to the properties and purposes of the collar on the MOV surfaces.

The disk 10, which has been provided with collar 14 in accordance with this invention, may be incorporated into an over-voltage surge arrester as one of a number of arrester-valve disks as described in U.S. Pat. No. 3,959,543. The resulting modified composite collar system exhibits a reduced physical interfacial gap with MOV surfaces, and good resistance to thermal, electrical and mechanical shock. No degradation/deterioration or failure of this collar material is observed when the MOV valve block is subjected to an elevated temperature (120°-130° C.) at an AC/DC bias, with 10% above the maximum continuous operating voltage for at least 250-1,000 hours.

The following example illustrates the practice of this invention.

EXAMPLE 1

A passivating coating composition is prepared by admixing 50.0% by weight of mullite, 13.0% by weight of kaolinite, 5.0% by weight of monoaluminum phosphate, 5.6% by weight of concentrated phosphoric acid, 1.0% by weight of zinc oxide as a modifier, and 25.4% by weight of deionized water and the composition is thoroughly mixed by means of a high shear mixer. A sintered metal oxide varistor disk having the following composition in mole percent is provided: 93-97% ZnO$_2$ and 3-7% additive comprising Bi$_2$O$_3$; Sb$_2$O$_3$; CoO or Co$_2$O$_3$ or Co$_3$O$_4$; MnO or MnO$_2$; Cr$_2$O$_3$; NiO; B$_2$O$_3$; SiO$_2$; Al(NO$_3$)$_3$·9H$_2$O etc. These compositions may be found in U.S. Pat. Nos. 3,959,543; 4,046,847; and 4,042,535, the disclosures of which are incorporated herein by reference. The adjustment of the paramerers described in items 1 through 4, supra, are dependent on the type of the zinc oxide MOV compositions. The disk is coated on the periphery thereof by spraying the passivating coating composition to a thickness of 0.5 millimeter. The thus coated metal oxide varistor is then heated to a temperature of 600° C. for two hours to form a ceramic collar on the varistor disk having enhanced contact adhesion.

In the event the specific gravity, viscosity and pH of the passivating coating compositions fall outside the ranges set forth in items 1 to 4, supra, due to the application temperature, quantity of deionized water and phosphoric acid, an adjustment in the amounts of the various ingredients will be required to bring the composition within the specified ranges (such as between the solids, liquids, solid to liquid, etc.).

What is claimed is:

1. A passivating coating composition suitable for application as a collar to metal oxide varistor valve block cylindrical surfaces comprising a mixture by dry weight of 55-85% mullite and 15-45% kaolinite, from 0.03 to 15% by weight of the coating composition of one of the following additive compounds: Y$_2$O$_3$; ZrO$_2$; ZnO; 2ZnO·3B$_2$O$_3$·7H$_2$O; 3ZnO·2B$_2$O$_3$·5H$_2$O; or Si$_3$N$_4$, and sufficient deionized water to form a sprayable slurry.

2. A composition as defined in claim 1 which further contains, by dry weight of the mullite and kaolinite, from 5-6% each of monoaluminum phosphate and phosphoric acid.

3. A composition as defined in claim 1 wherein the coating composition comprises 20-40% deionized water based upon the total weight of the coating composition less the weight of the additive compounds.

4. A composition as defined in claim 1 wherein the coating composition has a specific gravity in the range of 1.75-1.90, a pH in the range of 1.60-2.00, and a non-newtonian fluid viscosity in the range of 3500-8000 cps at an application temperature of 18°-37° C.

5. A passivating coating composition suitable for application as a collar to metal oxide varistor valve block cylindrical surfaces comprising a mixture by dry weight of 55-85% mullite and 15-45% kaolinite, from, 0.15 to 15% by weight of the coating composition including wafer of TiO$_2$ in addition to the amount of TiO$_2$ that may be inherently present in the kaolinite as an impurity and sufficient deionized water to form a sprayable slurry.

6. A composition as defined in claim 5 which further contains, by dry weight of the mullite and kaolinite, from 5-6% each of monoaliminum phosphate and phosphoric acid.

7. A composition as defined in claim 5 wherein the coating composition comprises 20-40% deionized water based upon the total weight of the coating composition less the weight of the additive compounds.

8. A composition as defined in claim 5 wherein the coating composition has a specific gravity in the range of 1.75-1.90, a pH in the range of 1.60-2.00, and a non-newtonian fluid viscosity in the range of 3500-8000 cps at an application temperature of 18°-37° C.

9. A composition as defined in claim 5 wherein the amount of added TiO$_2$ is within the range of from 0.20-15% by weight based upon the total weight of the coating composition.

* * * * *

UNITED STATES PATENT AND TRADEMARK OFFICE
CERTIFICATE OF CORRECTION

PATENT NO. : 5,203,915
DATED : April 20, 1993
INVENTOR(S) : Mohammad A. Alim

It is certified that error appears in the above-identified patent and that said Letters Patent is hereby corrected as shown below:

On the title page, in item [75] Inventor: correct the spelling of the inventor's first name to read --Mohammad--.

Column 1, line 38, "$\neq$" should read -- $\approx$ --.

Column 3, line 66, "$ZnO_2$" should read -- $ZnO$ --.

Signed and Sealed this

First Day of February, 1994

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,203,915

DATED : April 20, 1993

INVENTOR(S) : Mohammad A. Alim

It is certified that error appears in the above-identified patent and that said Letters Patent is hereby corrected as shown below:

```
    Column 3, line 10, between the words "To" and
"compounds", insert the words -- this composition
is added one of the following additive --.
```

Signed and Sealed this

Nineteenth Day of April, 1994

Attest:

BRUCE LEHMAN

Attesting Officer      Commissioner of Patents and Trademarks